(12) United States Patent
Seven et al.

(10) Patent No.: US 12,163,014 B2
(45) Date of Patent: Dec. 10, 2024

(54) COMPATIBILIZED POLYMERIC COMPOSITIONS FOR OPTICAL FIBER CABLE COMPONENTS

(71) Applicant: Dow Global Technologies LLC, Midland, MI (US)

(72) Inventors: Karl M. Seven, Auburn, PA (US); Mohamed Esseghir, Lawrenceville, NJ (US); Jeffrey M. Cogen, Flemington, NJ (US)

(73) Assignee: Dow Global Technologies LLC, Midland, MI (US)

( * ) Notice: Subject to any disclaimer, the term of this patent is extended or adjusted under 35 U.S.C. 154(b) by 445 days.

(21) Appl. No.: 17/620,792

(22) PCT Filed: Aug. 21, 2020

(86) PCT No.: PCT/US2020/047308
§ 371 (c)(1),
(2) Date: Dec. 20, 2021

(87) PCT Pub. No.: WO2021/050241
PCT Pub. Date: Mar. 18, 2021

(65) Prior Publication Data
US 2022/0340739 A1 Oct. 27, 2022

Related U.S. Application Data

(60) Provisional application No. 62/899,823, filed on Sep. 13, 2019.

(51) Int. Cl.
*C08L 23/06* (2006.01)
*C08F 220/18* (2006.01)
*C08F 220/32* (2006.01)
*C08G 63/183* (2006.01)
*C08L 23/08* (2006.01)
*C08L 23/26* (2006.01)
*C08L 33/06* (2006.01)
*C08L 33/08* (2006.01)

(Continued)

(52) U.S. Cl.
CPC ........ *C08L 23/06* (2013.01); *C08F 220/1804* (2020.02); *C08F 220/325* (2020.02);
(Continued)

(58) Field of Classification Search
CPC ........ C08L 23/06; C08L 67/03; C08L 33/068; C08L 33/08; C08L 33/10; C08L 23/26; C08L 23/0869; C08L 2205/035
See application file for complete search history.

(56) References Cited

U.S. PATENT DOCUMENTS 5,618,881 A * 4/1997 Hojabr ................. C08L 67/02
525/166
5,889,114 A * 3/1999 Statz ................... C08L 23/08
525/166

(Continued)

FOREIGN PATENT DOCUMENTS

JP 2001114995 A * 4/2001
WO 2007089644 A2 8/2007

(Continued)

OTHER PUBLICATIONS

Office Action from corresponding Chinese Application No. 202080060235.3 dated Mar. 13, 2024.

*Primary Examiner* — Rip A Lee
(74) *Attorney, Agent, or Firm* — Mark A. Twilley (57) ABSTRACT

A polymeric composition includes (a) 1 wt % to 45 wt % of an ethylene-based polymer; (b) 50 wt % to 90 wt % of a polybutylene terephthalate having a melt flow index from 21 g/10 min. to 35 g/10 min at 250 C and 2.16 Kg; and (c) 3.5 wt % to 10 wt % of a compatibilizer comprising a maleated ethylene-based polymer and ethylene n-butylacrylate glycidyl methacrylate.

10 Claims, 1 Drawing Sheet

(51) Int. Cl.
  *C08L 33/10* (2006.01)
  *C08L 67/03* (2006.01)
(52) U.S. Cl.
  CPC ........ *C08G 63/183* (2013.01); *C08L 23/0869* (2013.01); *C08L 23/26* (2013.01); *C08L 33/068* (2013.01); *C08L 33/08* (2013.01); *C08L 33/10* (2013.01); *C08L 67/03* (2013.01); *C08L 2203/18* (2013.01); *C08L 2203/202* (2013.01); *C08L 2205/025* (2013.01); *C08L 2205/035* (2013.01); *C08L 2207/062* (2013.01); *C08L 2207/066* (2013.01)

(56) References Cited

U.S. PATENT DOCUMENTS

| | | | |
|---|---|---|---|
| 6,020,414 A * | 2/2000 | Nelsen | B29C 48/04 |
| | | | 525/166 |
| 7,346,257 B2 | 3/2008 | Mumm et al. | |
| 8,090,232 B2 | 1/2012 | Kachmar | |
| 8,304,495 B1 * | 11/2012 | Fan | C08L 67/02 |
| | | | 525/445 |
| 9,598,565 B2 | 3/2017 | Seven et al. | |
| 9,670,345 B2 | 6/2017 | Esseghir et al. | |
| 10,502,913 B2 * | 12/2019 | Harris | G02B 6/443 |
| 2007/0087150 A1 | 4/2007 | Powell et al. | |
| 2008/0145009 A1 | 6/2008 | Mumm et al. | |
| 2013/0287353 A1 | 10/2013 | Molin et al. | |
| 2015/0316736 A1 | 11/2015 | Kachmar | |
| 2015/0370023 A1 | 12/2015 | Baca et al. | |
| 2015/0378119 A1 | 12/2015 | Granger et al. | |
| 2019/0023895 A1 | 1/2019 | Harris et al. | |

FOREIGN PATENT DOCUMENTS

| | | |
|---|---|---|
| WO | 2017152342 A1 | 9/2017 |
| WO | 2019050627 | 3/2019 |
| WO | 2019050627 A1 | 3/2019 |
| WO | 2021050241 | 3/2021 |

* cited by examiner

COMPATIBILIZED POLYMERIC COMPOSITIONS FOR OPTICAL FIBER CABLE COMPONENTS

BACKGROUND

Field of the Invention

The present disclosure generally relates to compatibilized polymeric compositions and more specifically to polymeric compositions including compatibilized polybutylene terephthalate and polyethylene blends.

Introduction

Materials used in optical fiber buffer tubes need to exhibit a balance of rigidity, flexibility, extrudability and kink resistance. Conventional buffer tubes are primarily composed of extruded polybutylene terephthalate ("PBT") that provides rigidity, but is prone to kinking during optical fiber installations. Kinking of the buffer tube is disadvantageous as it may result in damage to the optical fiber.

A conventional approach to increasing buffer tube flexibility involves blending PBT and polyethylene ("PE"). In such a blend, the PBT provides rigidity and telecommunications grease resistance while the PE imparts flexibility and kink resistance. PBT and PE blends incorporate a compatibilizer due to the polar nature of PBT and the non-polar nature of PE. One example of a conventional compatibilizer is maleic anhydride grafted polyethylene ("MAH-g-PE"). WO2019050627 discloses the use of PBT and PE blends that employ MAH-g-PE as a compatibilizer. Alternatively, another example of a conventional compatibilizer for PBT and PE blends is ethylene-n-butyl acrylate-glycidyl methacrylate terpolymer ("ENBAGMA"). WO2019050627 is silent regarding the use of ENBAGMA.

Recently, attempts have been made at replacing extrusion grade PBT (i.e., PBT having a melt flow index of less than 21 grams per 10 minutes (g/10 min.) at 250° C. and 2.16 Kg) with a relatively cheaper injection-molding-grade PBT (i.e., PBT having a melt flow index of 21 g/10 min. or greater) in PBT-PE buffer tubes. Use of injection-molding-grade PBT undesirably decreases the zero-shear viscosity of the PBT-PE blend to less than 3000 Pascal*seconds (PaS) at 250° C., thereby reducing extrudability. Buffer tubes extruded from injection-molding-grade PBT-PE blends exhibit kinking and dimensional stability issues such as tube wall thickness uniformity which negatively affects crush resistance.

Accordingly, it would be surprising to discover a PBT-PE-compatibilizer blend that exhibits a zero-shear viscosity greater than 3000 PaS at 250° C. and resists kinking but that utilizes PBT having a melt flow index of greater than 21 g/10 min.

SUMMARY

The present invention offers a solution to providing a PBT-PE-compatibilized blend that contains PBT having a melt flow index of greater than 21 g/10 min. and yet exhibits a zero-shear viscosity greater than 3000 PaS at 250° C. and resists kinking.

The present invention is a result of discovering that (1) ENBAGMA can increase the zero-shear viscosity of injection-molding-grade PBT and PE blends and that (2) neither MAH-g-PE nor ENBAGMA individually can maintain morphology stability in blended PE and PBT through both blending and extrusion. The inventors discovered that the ENBAGMA may bind to multiple PBT polymeric chains thereby increasing the zero-shear viscosity to greater than 3000 PaS at 250° C. for blended PE and PBT systems that will enable extrusion with high buffer tube dimensional uniformity. The inventors also discovered that both MAH-g-PE and ENBAGMA must be used to maintain stability of the mixed phases through high shear events such as mixing and extrusion. Stability of the mixed phase morphology prevents phase segregation that results in poor mechanical properties and kinking of the buffer tube. As such, relatively lower cost injection-molding-grade PBT can be used in the formation of buffer tubes that resist kinking. Examples exhibiting zero-shear viscosities below 3000 PaS at 250° C. and no kinking are still desirable.

The present invention is particularly useful for buffer tubes in optical fiber installations.

According to a first feature of the present disclosure, a polymeric composition, comprises (a) 1 wt % to 45 wt % of an ethylene-based polymer; (b) 50 wt % to 90 wt % of a polybutylene terephthalate having a melt flow index from 21 g/10 min. to 35 g/10 min at 250° C. and 2.16 Kg; and (c) 3.5 wt % to 10 wt % of a compatibilizer comprising a maleated ethylene-based polymer and ethylene n-butylacrylate glycidyl methacrylate.

BRIEF DESCRIPTION OF THE DRAWING

Reference is made to the accompanying drawings in which.

DETAILED DESCRIPTION

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B. and C in combination.

All ranges include endpoints unless otherwise stated. Subscript values in polymer formulae refer to mole average number of units per molecule for the designated component of the polymer.

Test methods refer to the most recent test method as of the priority date of this document unless a date is indicated with the test method number as a hyphenated two-digit number. References to test methods contain both a reference to the testing society and the test method number. Test method organizations are referenced by one of the following abbreviations: ASTM refers to ASTM International (formerly known as American Society for Testing and Materials); EN refers to European Norm; DIN refers to Deutsches Institut fir Normung; and ISO refers to International Organization for Standards.

As used herein, "unimodal" denotes a polymeric material having a molecular weight distribution ("MWD") such that its gel permeation chromatography ("GPC") curve exhibits only a single peak without a second peak, shoulder or hump. In contrast, as used herein, "bimodal" means that the MWD in a GPC curve exhibits the presence of two component polymers, such as by having two peaks or where one component may be indicated by a hump, shoulder, or tail relative to the peak of the other component polymer.

As used herein, the term weight percent ("wt %") designates the percentage by weight a component is of a total weight of the polymeric composition unless otherwise specified.

Melt index (I2) values herein refer to values determined according to ASTM method D1238 at 190 degrees Celsius (° C.) with 2.16 Kilogram (Kg) mass.

Polymeric Composition

The polymeric composition of the present invention includes a polyethylene-based polymer, polybutylene terephthalate and a compatibilizer. As will be explained in greater detail below, the polyethylene-based polymer may include a low-density polyethylene and/or a high-density polyethylene. The compatibilizer comprises a maleated ethylene-based polymer and ethylene n-butylacrylate glycidyl methacrylate. Such polymeric compositions can be extruded to form optical fiber cable protective components such as buffer tubes.

Ethylene-Based Polymer

As noted above, one component of the polymeric composition is an ethylene-based polymer. As used herein, "ethylene-based" polymers are polymers in which greater than 50 wt % of the monomers are ethylene though other co-monomers may also be employed. "Polymer" means a macromolecular compound comprising a plurality of monomers of the same or different type which are bonded together, and includes homopolymers and interpolymers. "Interpolymer" means a polymer comprising at least two different monomer types bonded together. Interpolymer includes copolymers (usually employed to refer to polymers prepared from two different monomer types), and polymers prepared from more than two different monomer types (e.g., terpolymers (three different monomer types) and quaterpolymers (four different monomer types)).

The ethylene-based polymer can be an ethylene homopolymer. As used herein, "homopolymer" denotes a polymer comprising repeating units derived from a single monomer type, but does not exclude residual amounts of other components used in preparing the homopolymer, such as catalysts, initiators, solvents, and chain transfer agents.

The ethylene-based polymer can be used alone or in combination with one or more other types of ethylene-based polymers (e.g., a blend of two or more ethylene-based polymers that differ from one another by monomer composition and content, catalytic method of preparation, molecular weight, molecular weight distributions, densities, etc.). If a blend of ethylene-based polymers is employed, the polymers can be blended by any in-reactor or post-reactor process.

Examples of suitable commercially available ethylene-based polymers are sold under the tradenames AXELERON CX 6944 NT™, DGDA-2300 NT™, and DMDA-1250 NT™, each available from The Dow Chemical Company, Midland, MI, USA.

The polymeric composition may comprise 1 wt % or greater, or 2 wt % or greater, or 4 wt % or greater, or 6 wt % or greater, or 8 wt % or greater, or 10 wt % or greater, or 12 wt % or greater, or 14 wt % or greater, or 16 wt % or greater, or 18 wt % or greater, or 20 wt % or greater, or 22 wt % or greater, or 24 wt % or greater, or 26 wt % or greater, or 28 wt % or greater, or 30 wt % or greater, or 32 wt % or greater, or 34 wt % or greater, or 36 wt % or greater, or 38 wt % or greater, or 40 wt % or greater, or 42 wt % or greater, or 44 wt % or greater, while at the same time, 45 wt % or less, 44 wt % or less, 42 wt % or less, 40 wt % or less, 38 wt % or less, 36 wt % or less, 34 wt % or less, 32 wt % or less, 30 wt % or less, or 28 wt % or less, or 26 wt % or less, or 24 wt % or less, or 22 wt % or less, or 20 wt % or less, or 18 wt % or less, or 16 wt % or less, or 14 wt % or less, or 12 wt % or less, or 10 wt % or less, or 8 wt % or less, or 6 wt % or less, or 4 wt % or less, or 2 wt % or less of ethylene-based polymer.

The ethylene-based polymer may comprise low-density polyethylene ("LDPE"). LDPE resins are commercially available and may be made by any one of a wide variety of processes including, but not limited to, solution, gas or slurry phase Ziegler-Natta, metallocene or constrained geometry catalyzed (CGC), etc. LDPE resins have a density ranging from 0.91 to 0.94 grams per cubic centimeter ("g/cm$^3$"). In various embodiments, the LDPE can have a density of at least 0.915 "g/cm$^3$", but less than 0.94 g/cm$^3$, or less than 0.93 g/cm$^3$, or in the range of from 0.920 to 0.925 g/cm$^3$. Polymer densities provided herein are determined according to ASTM D792. The LDPE can have a melt index, $I_2$, of less than 20 grams per 10 minutes ("g/10 min."), or ranging from 0.1 g/10 min. to 10 g/10 min., from 2 g/10 min. to 8 g/10 min., from 4 g/10 min. to 8 g/10 min., or have an $I_2$ of 1.9 g/10 min. Generally, LDPE resins have a broad molecular weight distribution ("MWD") resulting in a relatively high polydispersity index (the ratio of weight-average molecular weight to number-average molecular weight). LDPE can have a polydispersity index ("PDI") in the range of from 1.0 to 30.0, or in the range from 2.0 to 15.0, as determined by gel permeation chromatography. Commercially available LDPE resins include are sold under the tradenames AXELERON CX B-1258 NT™ and DXM 446™, both available from The Dow Chemical Company.

The polymeric composition may comprise 5 wt % or greater, or 6 wt % or greater, or 7 wt % or greater, or 8 wt % or greater, or 9 wt % or greater, or 10 wt % or greater, or 11 wt % or greater, or 12 wt % or greater, or 13 wt % or greater, or 14 wt % or greater, or 15 wt % or greater, or 16 wt % or greater, or 17 wt % or greater, or 18 wt % or greater, or 19 wt % or greater, or 20 wt % or greater, or 21 wt % or greater, or 22 wt % or greater, or 23 wt % or greater, or 24 wt % or greater, or 25 wt % or greater, while at the same time, 24 wt % or less, or 23 wt % or less, or 22 wt % or less, or 21 wt % or less, or 20 wt % or less, or 19 wt % or less, or 18 wt % or less, or 17 wt % or less, or 16 wt % or less, 15 wt % or less, or 14 wt % or less, or 13 wt % or less, or 12 wt % or less, or 11 wt % or less, or 10 wt % or less, or 9 wt % or less, or 8 wt % or less, or 7 wt % or less, or 6 wt % or less or less of LDPE.

The ethylene-based polymer may comprise high-density polyethylene ("HDPE"). HDPE is an ethylene-based polymer having a density of at least 0.94 g/cm$^3$, or from at least 0.94 g/cm$^3$ to 0.98 g/cm$^3$. HDPE has a melt index from 0.1 g/10 min to 25 g/10 min. HDPE can include ethylene and one or more $C_3$-$C_{20}$ α-olefin comonomers. The comonomer (s) can be linear or branched. Nonlimiting examples of suitable comonomers include propylene, 1-butene, 1 pentene, 4-methyl-1-pentene, 1-hexene, and 1-octene. HDPE can be prepared with either Ziegler-Natta, chromium-based, constrained geometry or metallocene catalysts in slurry reactors, gas phase reactors or solution reactors. The ethylene/$C_3$-$C_{20}$ α-olefin comonomer includes at least 50 percent by weight ethylene polymerized therein, or at least 70 percent by weight, or at least 80 percent by weight, or at least 85 percent by weight, or at least 90 weight percent, or at least 95 percent by weight ethylene in polymerized form. In an embodiment, the HDPE is an ethylene/α-olefin copolymer with a density from 0.95 g/cm$^3$ to 0.98 g/cm$^3$, and a melt index from 0.1 g/10 min to 10 g/10 min. In an embodiment, the HDPE has a density from 0.960 g/cm³ to 0.980 g/cm³, and a melt index from 0.1 g/10 min to 10 g/10 min. Nonlimiting examples of suitable HDPE are sold under the tradenames ELITE 5960G™, HDPE KT 10000 UE™, HDPE KS 10100 UE™, HDPE 35057E™, and AXELERON CX-A-6944 NT™, each available from The Dow Chemical Company Midland, Michigan, USA.

The HDPE may be unimodal or bimodal. In other embodiments, the HDPE is bimodal. Exemplary preparation methods for making unimodal HDPE can be found, for example, in U.S. Pat. Nos. 4,303,771 or 5,324,800. One example of a commercially available unimodal HDPE is sold under the tradename DGDL-3364NT™, available from The Dow Chemical Company, Midland, MI, USA.

The polymeric composition can comprise a bimodal HDPE. A HDPE comprises a first polymeric component and a second polymeric component. The first component can be an ethylene-based polymer, for example, the first component can be a high-molecular-weight ethylene homopolymer or ethylene/alpha-olefin copolymer. The first component may comprise any amount of one or more alpha-olefin copolymers. For example, the first component can comprise less than 10 wt % of one or more alpha-olefin comonomers, based on the total first component weight. The first component may comprise any amount of ethylene; for example, the first component can comprise at least 90 wt % of ethylene, or at least 95 wt % of ethylene, based on the total first component weight. The alpha-olefin comonomers present in the first component of the bimodal HDPE typically have no more than 20 carbon atoms. For example, the alpha-olefin comonomers may have from 3 to 10 carbon atoms, or from 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. In an embodiment, the alpha-olefin comonomers can be selected from the group consisting of propylene, 1-butene, 1-hexene, and 1-octene. In other embodiments, the alpha-olefin comonomers can be selected from the group consisting of 1-hexene and 1-octene.

The first component of the bimodal HDPE can have a density in the range of from 0.915 g/cm³ to 0.940 g/cm³, from 0.920 g/cm³ to 0.940 g/cm³, or from 0.921 g/cm³ to 0.936 g/cm³. The first component can have a melt index, $I_2$ (190° C./2.16 kg), in the range of from 0.5 10 g/10 min. to 10 g/10 min., from 1 10 g/10 min. to 7 g/10 min., or from 1.3 10 g/10 min. to 5 g/10 min. The first component can have a molecular weight in the range of from 150,000 g/mol to 375,000 g/mol, from 175,000 g/mol to 375,000 g/mol, or from 200,000 g/mol to 375,000 g/mol.

The second polymeric component of the bimodal HDPE can be an ethylene-based polymer; for example, the second component can be a low-molecular-weight ethylene homopolymer. The ethylene homopolymer may contain trace amounts of contaminate comonomers, for example alpha-olefin comonomers. In various embodiments, the second component can comprise less than 1 wt % of one or more alpha-olefin comonomers, based on the weight of the second component. For example, the second component may comprise from 0.0001 to 1.00 wt % of one or more alpha-olefin comonomers, or from 0.001 to 1.00 wt % of one or more alpha-olefin comonomers. The second component can comprise at least 99 wt % of ethylene, or in the range of from 99.5 wt % to 100 wt % of ethylene, based on the weight of the second component.

The second component of the bimodal HDPE can have a density in the range of from 0.965 to 0.980 g/cm³, or from 0.970 to 0.975 g/cm³. The second component can have a melt index ($I_2$) in the range of from 50 g/10 min to 1,500 g/10 min., from 200 g/10 min to 1,500 g/10 min., or from 500 g/10 min to 1,500 g/10 min. The second component can have a molecular weight in the range of 12,000 to 40,000 g/mol, from 15,000 to 40,000 g/mol, or from 20,000 to 40,000 g/mol.

A suitable preparation method for making bimodal HDPE can be found, for example, in U.S. Patent Application Publication No. 2009-0068429, paragraphs [0063] to [0086].

Examples of a commercially available bimodal HDPE are sold under the tradename DMDA-1250NT™ and DMDC 1250™, both available from The Dow Chemical Company, Midland, MI, USA.

The polymeric composition may comprise 5 wt % or greater, or 6 wt % or greater, or 7 wt % or greater, or 8 wt % or greater, or 9 wt % or greater, or 10 wt % or greater, or 11 wt % or greater, or 12 wt % or greater, or 13 wt % or greater, or 14 wt % or greater, or 15 wt % or greater, or 16 wt % or greater, or 17 wt % or greater, or 18 wt % or greater, or 19 wt % or greater, or 20 wt % or greater, or 21 wt % or greater, or 22 wt % or greater, or 23 wt % or greater, or 24 wt % or greater, or 25 wt % or greater, while at the same time, 24 wt % or less, or 23 wt % or less, or 22 wt % or less, or 21 wt % or less, or 20 wt % or less, or 19 wt % or less, or 18 wt % or less, or 17 wt % or less, or 16 wt % or less, 15 wt % or less, or 14 wt % or less, or 13 wt % or less, or 12 wt % or less, or 11 wt % or less, or 10 wt % or less, or 9 wt % or less, or 8 wt % or less, or 7 wt % or less, or 6 wt % or less or less of HDPE.

The ethylene-based polymer may comprise, consist or consist essentially of HDPE. The ethylene-based polymer may comprise, consist or consist essentially of LDPE. The HDPE and LDPE may be equal weight percentages of the ethylene-based polymer or may be different amounts. The ethylene-based polymer may be 0 wt % or greater, or 5 wt % or greater, or 10 wt % or greater, or 20 wt % or greater, or 30 wt % or greater, or 40 wt % or greater, or 50 wt % or greater, or 60 wt % or greater, or 70 wt % or greater, or 80 wt % or greater, or 90 wt % or greater, or 99 wt % or greater, while at the same time, 100 wt % or less, or 90 wt % or less, or 80 wt % or less, or 70 wt % or less, or 60 wt % or less, or 50 wt % or less, or 40 wt % or less, or 30 wt % or less, or 20 wt % or less, or 10 wt % or less, or 5 wt % or less of HDPE. The ethylene-based polymer may be 0 wt % or greater, or 5 wt % or greater, or 10 wt % or greater, or 20 wt % or greater, or 30 wt % or greater, or 40 wt % or greater, or 50 wt % or greater, or 60 wt % or greater, or 70 wt % or greater, or 80 wt % or greater, or 90 wt % or greater, or 99 wt % or greater, while at the same time, 100 wt % or less, or 90 wt % or less, or 80 wt % or less, or 70 wt % or less, or 60 wt % or less, or 50 wt % or less, or 40 wt % or less, or 30 wt % or less, or 20 wt % or less, or 10 wt % or less, or 5 wt % or less of LDPE.

Polybutylene Terephthalate

The PBT can have a density in the range of from 1.26 g/cm³ to 1.41 g/cm³, or from 1.30 g/cm³ to 1.35 g/cm³. In one or more embodiments, the PBT can have a melt index ($I_2$) in the range of from 7 g/10 min. to 15 g/10 min., or from 8 g/10 min. to 10 g/10 min. Melt indices for PBT are determined at 250 C and 2.16 Kg.

In various embodiments, the PBT can be an extrusion-grade PBT. In alternate embodiments, the PBT can be an injection-molding-grade PBT. Injection-molding-grade PBTs are typically characterized by having lower molecular weight, as evidenced by relatively higher melt indices. Accordingly, in one or more embodiments, the PBT can have a melt index (12) of at least 10 g/10 min., at least 15 g/10 min., at least 20 g/10 min., at least 25 g/10 min., at least 30 g/10 min., at least 35 g/10 min., at least 40 g/10 min., or at least 45 g/10 min. In such embodiments, the PBT can have a melt index (I2) of up to 75 g/10 min., up to 70 g/10 min., up to 65 g/10 min., up to 60 g/10 min., up to 55 g/10 min., or up to 50 g/10 min.

Examples of commercially available extrusion-grade PBTs include are sold under the tradenames PBT-61008™ from Suzhou Yingmao Plastics Company, Jiangsu, China; ULTRADUR BN6550™ from BASF, Ludwigshafen, Germany; CRASTIN 6129 NC1010™ from DuPont, Wilmington, Delaware, USA; and PBT VALOX 176™ from Sabic Innovative Plastics, Pittsfield, Massachusetts, USA. An example of a commercially available injection-molding-grade PBT is sold under the tradename CRASTIN 6134™ from DuPont, Wilmington, Delaware, USA.

The polymeric composition comprises from 50 wt % to 90 wt % PBT. The polymeric composition may comprise 50 wt % or greater, or 52 wt % or greater, or 54 wt % or greater, or 56 wt % or greater, or 58 wt % or greater, or 60 wt % or greater, or 62 wt % or greater, or 64 wt % or greater, or 66 wt % or greater, or 68 wt % or greater, or 70 wt % or greater, or 72 wt % or greater, or 74 wt % or greater, or 76 wt % or greater, or 78 wt % or greater, or 80 wt % or greater, or 82 wt % or greater, or 84 wt % or greater, or 86 wt % or greater, or 88 wt % or greater, while at the same time, 90 wt % or less, or 88 wt % or less, or 86 wt % or less, or 84 wt % or less, or 82 wt % or less, or 80 wt % or less, or 78 wt % or less, or 76 wt % or less, or 74 wt % or less, or 72 wt % or less, or 70 wt % or less, or 68 wt % or less, or 66 wt % or less, or 64 wt % or less, or 62 wt % or less, or 60 wt % or less, or 58 wt % or less, or 56 wt % or less, or 54 wt % or less, or 52 wt % or less of PBT.

Compatibilizer

The polymeric composition further comprises a compatibilizer. The compatibilizer comprises both a maleated ethylene-based polymer and ethylene n-butylacrylate glycidyl methacrylate.

As used herein, the term "maleated" indicates a polymer (e.g., an ethylene-based polymer) that incorporates a maleic anhydride monomer. Maleated ethylene-based polymer can be a interpolymer of maleic anhydride monomer (i.e., along the polymeric backbone) with ethylene and other monomers. Additionally, or alternatively, the maleic anhydride may be bonded to the ethylene-based polymer in a grafted orientation. The above-noted description of ethylene-based polymer is equally applicable to the maleated ethylene-based polymer.

The maleated ethylene-based polymer can have a density of 0.90 g/cm$^3$ or greater, or 0.91 g/cm$^3$ or greater, or 0.92 g/cm$^3$ or greater, or 0.93 g/cm$^3$ or greater, or 0.933 g/cm$^3$ or greater, or 0.935 g/cm$^3$ or greater, or 0.937 g/cm$^3$ or greater, or 0.94 g/cm$^3$ or greater, or 0.943 g/cm$^3$ or greater, or 0.945 g/cm$^3$ or greater, or 0.947 g/cm$^3$ or greater, or 0.95 g/cm$^3$ or greater, or 0.958 g/cm$^3$ or greater, 0.965 g/cm$^3$ or greater, while at the same time, 0.97 g/cm$^3$ or less, or 0.965 g/cm$^3$ or less, or 0.96 g/cm$^3$ or less, or 0.95 g/cm$^3$ or less, or 0.94 g/cm$^3$ or less, or 0.93 g/cm$^3$ or less.

The maleated ethylene-based polymer can have a melt index ranging from 0.1 to 10 g/10 min., from 0.2 to 8 g/10 min., or from 0.5 to 5 g/10 min at 190° C. and 2.16 Kg.

"Maleic Anhydride Content" is defined herein as the amount of reacted Maleic anhydride bound to the ethylene-based polymer. The maleated ethylene-based polymer can have a Maleic Anhydride Content, based on the total weight of the maleated ethylene-based polymer, of 0.25 wt % or greater, or 0.50 wt % or greater, or 0.75 wt % or greater, or 1.00 wt % or greater, or 1.25 wt % or greater, or 1.50 wt % or greater, or 1.75 wt % or greater, or 2.00 wt % or greater, or 2.25 wt % or greater, or 2.50 wt % or greater, or 2.75 wt % or greater, while at the same time, 3.00 wt % or less, 2.75 wt % or less, or 2.50 wt % or less, or 2.25 wt % or less, or 2.00 wt % or less, or 1.75 wt % or less, or 1.50 wt % or less, or 1.25 wt % or less, or 1.00 wt % or less, or 0.75 wt % or less, or 0.5 wt % or less. Maleic Anhydride Content is determined by Titration Analysis. Titration Analysis is performed by utilizing dried resin and titrates with 0.02N KOH to determine the amount of maleic anhydride. The dried polymers are titrated by dissolving 0.3 to 0.5 grams of maleated polymer in about 150 mL of refluxing xylene. Upon complete dissolution, deionized water (four drops) is added to the solution and the solution is refluxed for 1 hour. Next, 1% thymol blue (a few drops) is added to the solution and the solution is over titrated with 0.02N KOH in ethanol as indicated by the formation of a purple color. The solution is then back-titrated to a yellow endpoint with 0.05N HCl in isopropanol.

The polymeric composition may comprise from 2.5 wt % to 7.5 wt % maleated ethylene-based polymer. For example, the polymeric composition may comprise 2.5 wt % or greater, or 3.0 wt % or greater, or 3.5 wt % or greater, or 4.0 wt % or greater, or 4.5 wt % or greater, or 5.0 wt % or greater, or 5.5 wt % or greater, or 6.0 wt % or greater, or 6.5 wt % or greater, or 7.0 wt % or greater, while at the same time, 7.5 wt % or less, or 7.0 wt % or less, or 6.5 wt % or less, or 6.0 wt % or less, or 5.5 wt % or less, or 5.0 wt % or less, or 4.5 wt % or less, or 4.0 wt % or less, or 3.5 wt % or less, or 3.0 wt % or less.

Examples of suitable commercially available maleated ethylene-based polymer are sold under the tradenames AMPLIFY TY1053H™, AMPLIFY GR204™, and AMPLIFYGR205™ available from The Dow Chemical Company, Midland, MI, USA; BYNEL™ 4000 series and FUSABOND™ P series products, available from DuPont, Wilmington, DE, USA; OREVAC™ grafted polyethylenes, available from Arkema, Colombes, France; and POLYBOND™ 3000 series grafted polyethylenes, available from Addivant, Danbury, CT, USA.

The compatibilizer also comprises ethylene n-butylacrylate glycidyl methacrylate. ENBAGMA is a random terpolymer of ethylene, acrylic ester, and glycidyl methacrylate.

The ENBAGMA can have a density of 0.93 g/cm$^3$ or greater, or 0.933 g/cm$^3$ or greater, or 0.935 g/cm$^3$ or greater, or 0.937 g/cm$^3$ or greater, or 0.94 g/cm$^3$ or greater, or 0.943 g/cm$^3$ or greater, or 0.945 g/cm$^3$ or greater, or 0.947 g/cm$^3$ or greater, or 0.95 g/cm$^3$ or greater, or 0.958 g/cm$^3$ or greater, 0.965 g/cm$^3$ or greater, while at the same time, 0.97 g/cm$^3$ or less, or 0.965 g/cm$^3$ or less, or 0.96 g/cm$^3$ or less. The ENBAGMA can have a melt index ranging from 6 to 14 g/10 min. at 190° C. and 2.16 kg or from 8 to 12 g/10 min.

The ENBAGMA can have a glycidyl methacrylate content, based on the total weight of the ENBAGMA, of 1 wt % or greater, or 2 wt % or greater, or 3 wt % or greater, or 4 wt % or greater, or 5 wt % or greater, or 6 wt % or greater, or 7 wt % or greater, or 8 wt % or greater, or 9 wt % or greater, or 10 wt % or greater, or 11 wt % or greater, or 12 wt % or greater, or 13 wt % or greater, while at the same time, 14 wt % or less, 13 wt % or less, or 12 wt % or less, or 11 wt % or less, or 10 wt % or less, or 9 wt % or less, or 8 wt % or less, or 7 wt % or less, or 6 wt % or less, or 5 wt % or less, or 4 wt % or less, or 3 wt % or less, or 2 wt % or less.

The polymeric composition may comprise from 2.5 wt % to 7.5 wt % of ENBAGMA. For example, the polymeric composition may comprise 2.5 wt % or greater, or 3.0 wt % or greater, or 3.5 wt % or greater, or 4.0 wt % or greater, or 4.5 wt % or greater, or 5.0 wt % or greater, or 5.5 wt % or greater, or 6.0 wt % or greater, or 6.5 wt % or greater, or 7.0 wt % or greater, while at the same time, 7.5 wt % or less, or 7.0 wt % or less, or 6.5 wt % or less, or 6.0 wt % or less, or 5.5 wt % or less, or 5.0 wt % or less, or 4.5 wt % or less, or 4.0 wt % or less, or 3.5 wt % or less, or 3.0 wt % or less of ENBAGMA.

Examples of suitable commercially available ENBAGA include, but are not limited to, ELVALOY PTW™ and ELVALOY 4170™ from DuPont, Wilmington, Delaware, USA.

Additives

The polymeric composition can include one or more particulate fillers, such as glass fibers or various mineral fillers including nano-composites. Fillers, especially those with elongated or platelet-shaped particles providing a higher aspect ratio (length/thickness), may improve modulus and post-extrusion shrinkage characteristics. The filler(s) can have a median size or d50 of less than 20 μm, less than 10 μm, or less than 5 μm. The fillers may be surface treated to facilitate wetting or dispersion in the polymeric composition. Specific examples of suitable fillers include, but are not limited to, calcium carbonate, silica, quartz, fused quartz, talc, mica, clay, kaolin, wollastonite, feldspar, aluminum hydroxide, carbon black, and graphite. Fillers may be included in the polymeric composition in an amount ranging from 2 to 30 wt %, or from 5 to 30 wt % based on the total weight of the polymeric composition.

The polymeric composition may comprise a nucleating agent. Examples of suitable nucleating agents include ADK NA-11™, available commercially from Asahi Denim Kokai, and HYPERFORM HPN-20E™, available from Milliken Chemical. The nucleating agents can be included in the polymeric composition in amounts ranging from 0.08 wt % to 0.3 wt %, from 0.09 wt % to 0.25 wt %, or from 0.1 to 0.22 wt % based on the total polymeric composition weight.

The polymeric composition may comprise additional additives in the form of antioxidants, cross-linking co-agents, cure boosters and scorch retardants, processing aids, coupling agents, ultraviolet stabilizers (including UV absorbers), antistatic agents, additional nucleating agents, slip agents, lubricants, viscosity control agents, tackifiers, anti-blocking agents, surfactants, extender oils, acid scavengers, flame retardants and metal deactivators. The polymeric composition may comprise from 0.01 wt % to 10 wt % additives (i.e., one or more of the additives).

The UV light stabilizers may comprise hindered amine light stabilizers ("HALS") and UV light absorber ("UVA") additives. Representative UVA additives include benzotriazole types such as TINUVIN 326™ and TINUVIN 328™ commercially available from Ciba, Inc. Blends of HAL's and UVA additives are also effective.

The antioxidants may comprise hindered phenols such as tetrakis[methylene(3,5-di-tert-butyl-4-hydroxyhydro-cinnamate)]methane; bis[(beta-(3,5-ditert-butyl-4-hydroxybenzyl) methylcarboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers.

The processing aids may comprise metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non-ionic surfactants; silicone fluids and polysiloxanes.

Compounding

The components of the polymeric composition can be added to a batch or continuous mixer for melt blending. The components can be added in any order or first preparing one or more masterbatches for blending with the other components. The melt blending may be conducted at a temperature above the highest melting polymer but lower than the maximum compounding temperature of 285° C. The melt-blended composition can then either be delivered to an extruder or an injection-molding machine or passed through a die for shaping into the desired article, or converted to pellets, tape, strip or film or some other form for storage or to prepare the material for feeding to a next shaping or processing step. Optionally, if shaped into pellets or some similar configuration, then the pellets, etc. can be coated with an anti-block agent to facilitate handling while in storage.

Examples of compounding equipment that may be used include internal batch mixers, continuous single or twin-screw mixers, or kneading continuous extruders. The type of mixer utilized, and the operating conditions of the mixer, will affect properties of the composition such as viscosity, volume resistivity, and extruded surface smoothness.

The polymeric composition can exhibit a flex modulus in the range of from 1,500 to 2,400 megapascals ("MPa"), from 1,550 to 2,350 MPa, or from 1,600 to 2,000 MPa. The flex modulus is determined according to the procedure described in the Test Methods section, below. The polymeric composition can exhibit a maximum tensile stress in the range of from 35 to 50 MPa, or from 35 to 45 MPa. Maximum tensile stress is determined according to the procedure described in the Test Methods section, below.

In various embodiments, particularly in embodiments where the polymeric composition is intended for use in buffer tubes containing a hydrocarbon filling compound, the polymeric composition can exhibit a weight increase of less than 3 wt %, less than 2 wt %, less than 1 wt %, or less than 0.5 wt % when immersed in INFOGEL LA 444™ (a fiber-optic-cable buffer-tube filling compound). INFOGEL LA 444™ is composed of at least about 70 wt % mineral oil and up to about 10 wt % styrene-butadiene-styrene block copolymer, and is commercially available from Honghui Corp., China.

The polymeric composition may exhibit a melt index of 4 to 11 g/10 min. at 250° C. and 2.16 Kg. For example, the melt flow index can be 4 g/10 min. or greater, or 4.5/10 min. or greater, or 5 g/10 min. or greater, or 5.5/10 min. or greater, or 6 g/10 min. or greater, or 6.5/10 min. or greater, or 7 g/10 min. or greater, or 7.5/10 min. or greater, or 8 g/10 min. or greater, or 8.5/10 min. or greater, or 9 g/10 min. or greater, or 9.5/10 min. or greater, or 10 g/10 min. or greater, or 10.5/10 min. or greater, while at the same time, 11 g/10 min. or less, or 10.5 g/10 min. or less, or 10 g/10 min. or less, or 9.5 g/10 min. or less, or 9 g/10 min. or less, or 8.5 g/10 min.

or less, or 8 g/10 min. or less, or 7.5 g/10 min. or less, or 7 g/10 min. or less, or 6.5 g/10 min. or less, or 6 g/10 min. or less, or 5.5 g/10 min. or less, or 5 g/10 min. or less, or 4.5 g/10 min. or less.

The polymeric composition may exhibit a zero-shear viscosity at 250° C. of 200 PaS or greater, or 500 PaS or greater, or 1,000 PaS or greater, or 5,000 PaS or greater, or 10,000 PaS or greater, or 15,000 PaS or greater, or 20,000 PaS or greater, or 25,000 PaS or greater, while at the same time, 30.000 PaS or less, or 25,000 PaS or less, or 20,000 PaS or less, or 15,000 PaS or less, or 10,000 PaS or less, or 5,000 PaS or less, or 1,000 PaS or less, or 500 PaS or less. The test method for zero-shear viscosity is detailed below.

The polymeric composition may exhibit a break stress of 25 MPa or greater, or 26 MPa or greater, or 27 MPa or greater, or 28 MPa or greater, or 29 MPa or greater, or 30 MPa or greater, or 31 MPa or greater, or 32 MPa or greater, or 33 MPa or greater, or 34 MPa or greater, or 35 MPa or greater, or 36 MPa or greater, or 37 MPa or greater, or 38 MPa or greater, or 39 MPa or greater, or 40 MPa or greater, or 41 MPa or greater, or 42 MPa or greater, or 43 MPa or greater, or 44 MPa or greater, while at the same time, 45 MPa or less, or 44 MPa or less, or 43 MPa or less, or 42 MPa or less, or 41 MPa or less, or 40 MPa or less, or 39 MPa or less, or 38 MPa or less, or 37 MPa or less, or 36 MPA or less, or 35 MPa or less, or 34 MPa or less, or 33 MPa or less, or 32 MPa or less, or 31 MPa or less, or 30 MPa or less, or 29 MPa or less, or 28 MPa or less, or 27 MPa or less, or 26 MPA or less.

The polymeric composition may exhibit a flexural modulus of 1,000 MPa or greater, or 1.100 MPa or greater, or 1,200 MPa or greater, or 1,300 MPa or greater, or 1,400 MPa or greater, or 1,500 MPa or greater, or 1,600 MPa or greater, or 1,700 MPa or greater, or 1,800 MPa or greater, or 1,900 MPa or greater, or 2,000 MPa or greater, or 2,100 MPa or greater, or 2,200 MPa or greater, or 2,300 MPa or greater, or 2,400 MPa or greater, or 2,500 MPa or greater, or 2,600 MPa or greater, or 2,700 MPa or greater, or 2,800 MPa or greater, or 2,900 MPa or greater, while at the same time, 3,000 MPa or less, or 2,900 MPa or less, or 2,800 MPa or less, or 2,700 MPa or less, or 2,600 MPa or less, or 2,500 MPa or less, or 2,400 MPa or less, or 2,300 MPa or less, or 2.200 MPa or less, or 2,100 MPA or less, or 2,000 MPa or less, or 1,900 MPa or less, or 1.800 MPa or less, or 1,700 MPa or less, or 1,600 MPa or less, or 1,500 MPa or less, or 1,400 MPa or less, or 1,300 MPa or less, or 1,200 MPa or less, or 1,100 MPA or less.

The polymeric composition may exhibit a tube crush strength of 55 MPa or greater, or 56 MPa or greater, or 57 MPa or greater, or 58 MPa or greater, or 59 MPa or greater, or 60 MPa or greater, or 61 MPa or greater, or 62 MPa or greater, or 63 MPa or greater, or 64 MPa or greater, or 65 MPa or greater, or 66 MPa or greater, or 67 MPa or greater, or 68 MPa or greater, or 69 MPa or greater, or 70 MPa or greater, or 71 MPa or greater, or 72 MPa or greater, or 73 MPa or greater, or 74 MPa or greater, while at the same time, 75 MPa or less, or 74 MPa or less, or 73 MPa or less, or 72 MPa or less, or 71 MPa or less, or 70 MPa or less, or 69 MPa or less, or 68 MPa or less, or 67 MPa or less, or 66 MPA or less, or 65 MPa or less, or 64 MPa or less, or 63 MPa or less, or 62 MPa or less, or 61 MPa or less, or 60 MPa or less, or 59 MPa or less, or 58 MPa or less, or 57 MPa or less, or 56 MPA or less.

Optical Fiber Cable

Figure 1:
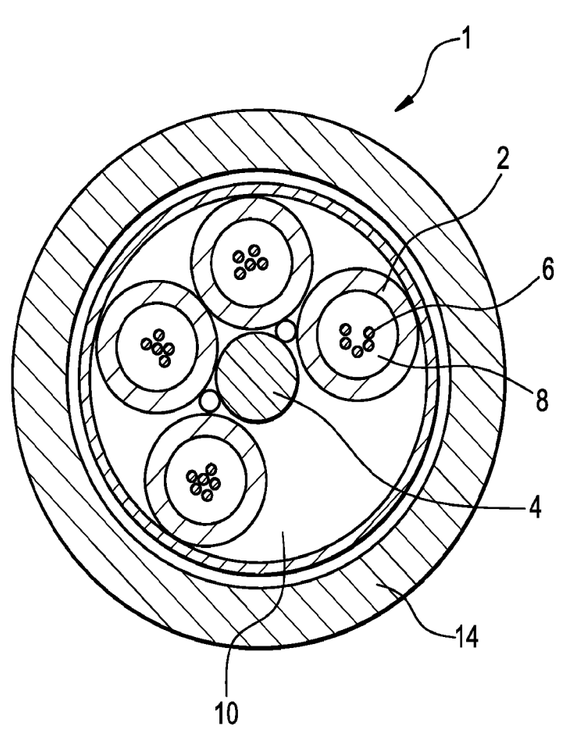
FIG. 1 shows a cross-sectional view of a loose buffer tube optical fiber cable.

Referring now to FIG. 1, depicted is a cross-sectional view of an exemplary optical fiber cable 1. In the depicted example, the optical fiber cable 1 is a "loose buffer tube" design. In such a cable design, buffer tubes 2 are positioned radially around a central strength member 4, with a helical rotation to the buffer tubes 2 along an axial length of the optical fiber 1. The helical rotation of the buffer tubes 2 allow bending of the cable without significantly stretching the tube or the optical fibers 6. If a reduced number of buffer tubes 2 is required, then foamed filler rods can be used as spacers to occupy one or more buffer tube positions 10 to maintain geometry of the cable 1. A cable jacket 14 is generally fabricated from a polyethylene-based material. The buffer tubes 2 may comprise, consist or consist essentially of the polymeric composition. As such, the buffer tube 2 may be a polymeric tube. The buffer tubes 2 are optionally filled with an optic cable grease or gel 8. Gel and grease compounds may include hydrocarbon-based greases incorporating hydrocarbon oils and/or polymer-based greases that use a low viscosity polymer formulated with hydrocarbon oils. These greases and gels provide the suspension and protection needed in the immediate environment surrounding the optical fibers 6, including eliminating air space. The gel and grease also provide a barrier against water penetration that is detrimental to performance of the optical fibers 6.

The buffer tube 2 comprising, consisting or consisting essentially of the polymeric composition may be advantageous of a variety of reasons. First, as the polymeric comparison resists kinking, the likelihood of damage occurring to the optical fibers 1 is decreased. Second, the ability to utilize relatively lower cost injection-molding-grade PBT decreases the cost associated with the buffer tubes 2.

Examples

Materials

The following materials are employed in the Examples, below.

PBT is a PBT having a density of 1.30 g/cm$^3$ and a melt index of 33.5 g/10 min. at 250° C. (i.e., injection-molding-grade), that is commercially available as CRASTIN 6134™ from DuPont, Wilmington, Delaware, USA.

LDPE is a high-pressure low-density polyethylene having a density of 0.921 g/cm$^3$ and a melt index of 1.9 g/10 min., that is commercially available as DXM-446™ from The Dow Chemical Company, Midland, MI, USA.

HDPE is a bimodal HDPE having a density of 0.955 g/cm$^3$ and a melt index ($I_2$) of 1.5 g/10 min. at 190° C., that is commercially available as DMDC-1250 NT™ from The Dow Chemical Company, Midland, MI, USA.

MAH-g-HDPE is a maleic-anhydride-grafted HDPE having a density of 0.958 g/cm$^3$, a melt index of 2.0 g/10 min., and a maleic anhydride content of greater than 1.0 wt %, that is commercially available as AMPLIFY TY 1053H™ from The Dow Chemical Company, Midland, MI, USA.

ENBAGMA1 is ethylene n-butylacrylate glycidyl methacrylate having a density of 0.94 g/cm$^3$, a melt index of 12 g/10 min. at 190° C. and a glycidyl methacrylate composition of 5 wt % of the weight of the ENBAGMA1, that is commercially available as Elvaloy PTW™ from The Dow Chemical Company, Midland, MI, USA.

ENBAGMA2 is ethylene n-butylacrylate glycidyl methacrylate having a density of 0.94 g/cm$^3$, a melt index of 8 g/10 min. at 190° C. and a glycidyl methacrylate composition of 9 wt % of the weight of the ENBAGMA2, that is commercially available as Elvaloy 4170™ from The Dow Chemical Company. Midland, MI, USA.

NA-11A is a nucleating agent with the chemical name sodium 2,2'-methylene-bis-(4,6-di-tert-butylphenyl)phosphate (CAS No. 85209-91-2), that is commercially available from ADEKA Corporation, Tokyo, Japan.

AO1 is a sterically hindered phenolic antioxidant having the chemical name pentaerythritol tetrakis(3-(3,5-di-tert-butyl-4-hydroxyphenyl)propionate), that is commercially available as IRGANOX 1010™ from BASF, Ludwigshafen, Germany.

AO2 is a hydrolytically stable phosphite processing stabilizer having the chemical name tris(2,4-ditert-butylphenyl)phosphite, that is commercially available as IRGAFOS 168 from BASF, Ludwigshafen, Germany.

Tube Sample Preparation

Prepare Inventive Examples and Comparative Examples by performing coated wire extrusion. Coated wire extrusion models both the dimensions of a buffer tube and tests extrusion performance of the polymeric composition. Perform the coated wire extrusion using a BRABENDER Mini-wire line on 14-gauge copper wire. The BRABENDER Mini-wire line settings are provided in Table 1.

TABLE 1

| Parameter | Condition |
|---|---|
| Zone 1 | 250° C. |
| Zone 2 | 260° C. |
| Zone 3 | 250° C. |
| Zone 4 | — |
| Orifice Size | 114 mil |
| Wire Diameter | 64 mil |
| RPM | 40 |
| Take off speed | 16 ft/min |

The Inventive and Comparative Examples have a final diameter of approximately 2.9 mm (0.114″) and a wall thickness of approximately 0.635 mm (25 mil) on 14 American Wire Gauge solid copper conductor of 1.63 mm (0.064″) diameter. Pull the conductor from the wire to leave tubes of the Inventive and Comparative Examples. Perform mechanical testing on the tubes.

Test Methods

Employ the following test methods to determine the properties of the materials and the Inventive and Comparative Examples, below.

Density

Unless otherwise specified, determine polymeric densities according to ASTM D792 at 23° C.

Break Strength

Cut the tubes to a length of 10.16 cm. Clamp the tube into an INSTRON 4202 tensile testing unit with a jaw separation of 2.54 cm, with a 100 lbs load cell. Set crosshead speed to 5.08 cm/min and measure the stress at the pulling break point of the tubes. Repeat five times and take the average.

Flex Modulus

Die cut rectangular samples of 1.27 cm wide by 7.62 cm by 0.0127 cm from compression molded plaques. Place samples in a flex fixture of an INSTRON 4202 tester for 3-point deflection using a 5.08 cm span and crosshead speed of 0.127 cm/min. Determine the flex modulus at the maximum flexural stress sustained during the test.

Kinking

Wrap tube samples 1 complete wrap around a 6 mm mandrel and hold in position for 10 seconds at 23° C. Observe any kinking that forms.

Tube Crush

Place tube in an INSTRON 4202 between an upper moveable plate (dimensions 50 mm×100 mm) attached to a crosshead and a lower stationary plate (dimensions 50 mm×100 mm). Align the tube to the longer dimension of the plate and move the top plate to just touch the top of the tube. Set crosshead speed to 0.127 cm/min and record the compressive force at the yield point of the tube.

Zero Shear Viscosity

Apply 300 Pa of stress at 250° C. for 3 minutes using a RHEOMETRICS SR-200 controlled stress rheometer equipped with 25 mm parallel plates. Calculate zero shear viscosity over a range in the data that the time rate of change of the measured strain is constant. Allow for 15-minute recovery times.

Results

Table 2 provides the composition and associated mechanical properties for Comparative Examples 1-5 ("CE1-CE5") and Inventive Examples 1-10 ("IE1-IE10").

TABLE 2

| Material | IE1 | IE2 | IE3 | IE4 | 1E5 | IE6 | IE7 | CE1 | CE2 | CE3 | CE4 | CE5 |
|---|---|---|---|---|---|---|---|---|---|---|---|---|
| PBT | 70.85 | 70.85 | 70.85 | 50 | 60 | 80 | 90 | 100 | 70.85 | 70.85 | 70.85 | 70.85 |
| LDPE | 11.65 | 9.15 | 9.15 | 22.075 | 17.075 | 7.075 | 2.075 | — | 12.97 | 12.97 | 11.65 | 11.65 |
| HDPE | 11.65 | 9.15 | 9.15 | 22.075 | 17.075 | 7.075 | 2.075 | — | 12.97 | 12.97 | 11.65 | 11.65 |
| MAH-g-HDPE | 2.50 | 5 | 5.00 | 2.50 | 2.5 | 2.5 | 2.5 | — | 2.36 | — | — | 5.00 |
| ENBAGMA1 | — | — | 5.00 | 2.50 | 2.5 | 2.5 | 2.5 | — | — | 2.36 | 5.00 | — |
| ENBAGMA2 | 2.50 | 5.00 | — | — | — | — | — | — | — | — | — | — |
| NA11 | 0.21 | 0.21 | 0.21 | 0.21 | 0.21 | 0.21 | 0.21 | — | 0.21 | 0.21 | 0.21 | 0.21 |
| AO 1 | 0.43 | 0.43 | 0.43 | 0.43 | 0.43 | 0.43 | 0.43 | — | 0.43 | 0.43 | 0.43 | 0.43 |
| AO 2 | 0.21 | 0.21 | 0.21 | 0.21 | 0.21 | 0.21 | 0.21 | — | 0.21 | 0.21 | 0.21 | 0.21 |
| TOTAL | 100 | 100 | 100 | 100 | 100 | 100 | 100 | 100 | 100 | 100 | 100 | 100 |
| Break Stress (MPa) | 30 | 32 | 33 | 27 | 32 | 38 | 42 | 54 | 21 | 28 | 26 | 24 |
| Kinking | None | None | None | None | None | None | None | Severe Kinks | Kinks | Slight Kinks | Kinks | Kinks |
| Zero Shear Viscosity (PaS at 250° C.) | 10560 | 23640 | 7532 | 38490 | 58220 | 6007 | 213 | 78 | 3216 | 9006 | 11510 | 2813 |
| Flex Modulus (MPa) | 2050 | 1830 | 2265 | 1223 | 1417 | 2054 | 2507 | 2754 | 2246 | 1891 | 1923 | 2463 |
| Tube Crush (MPa) | 65.8 | 65.7 | 66.7 | 56.77 | 68.53 | 72.62 | 72.59 | 64.9 | 64.9 | 69.7 | 72.0 | 71 |

As can be seen from Table 2, the presence of MAH-g-HDPE or ENBAGMA alone in CE1-CE5 results in samples that exhibit kinking. CE1 is a neat PBT sample representing conventional buffer tube manufacturing. CE2 and CE5 are samples having a composition similar to that of the Inventive Examples except only utilizing MAH-g-HDPE. CE3 and CE4 are samples having a composition similar to that of the Inventive Examples except only utilizing ENBAGMA. Although CE1 offers greater break stress than IE1-IE7, CE1 exhibits severe kinking consistent with prior art experiences. CE2-CE5, while incorporating MAH-g-HDPE or ENBAGMA individually, suffer from morphology instability resulting in both lower break stress values than IE1-IE7 as well as greater amounts of kinking than IE1-IE7. Kinking is not desirable in buffer tubes because it can exert additional stresses (bending stresses) on the fibers within the buffer tube.

As evident from Table 2, the combined presence of MAH-g-HDPE and ENBAGMA as a compatibilizer provides Inventive Examples (1) with a sufficiently high Zero Shear Strength to extrude, (2) no kinking and (3) break stresses greater than the Comparative Examples. For example, IE1 has a substantially similar composition as CE2-CE5, yet exhibits no kinking unlike CE2-CE5. IE1-IE7 illustrate that the combination of MAH-g-HDPE and ENBAGMA as a compatibilizer functions over a wide compositional range.

It is important to note that the total amount of compatibilizer is not the primary factor, but rather the presence of both MAH-g-HDPE and ENBAGMA. For example, CE4 and CE5 both comprise the same total amount of compatibilizer (i.e., 5 wt %) as IE1 and IE4-IE7 but exhibits kinking unlike IE1 and IE4-IE7. As such, it has been demonstrated that the combination of MAH-g-HDPE and ENBAGMA provides results that are advantageous and surprising.

What is claimed is:

1. A polymeric composition, comprising:
   (a) 1 wt % to 45 wt % of an ethylene-based polymer;
   (b) 50 wt % to 90 wt % of a polybutylene terephthalate having a melt flow index from 21 g/10 min to 35 g/10 min at 250° C. and 2.16 kg; and
   (c) 3.5 wt % to 10 wt % of a compatibilizer comprising a maleated ethylene-based polymer and ethylene n-butylacrylate glycidyl methacrylate.

2. The polymeric composition of claim 1, wherein the polymeric composition comprises from 1 wt % to 30 wt % ethylene-based polymer and from 60 wt % to 90 wt % polybutylene terephthalate.

3. The polymeric composition of claim 1, wherein the maleated ethylene-based polymer has a density of 0.958 g/cm$^3$.

4. The polymeric composition of claim 1, wherein the ethylene-based polymer comprises a low-density polyethylene having a density of 0.921 g/cm$^3$ and a high-density polyethylene having a density of 0.955 g/cm$^3$.

5. The polymeric composition of claim 4, wherein the low-density polyethylene is from 5 wt % to 15 wt % of the polymeric composition and the high-density polyethylene is from 5 wt % to 15 wt % of the polymeric composition.

6. The polymeric composition of claim 1, wherein the polymeric composition comprises from 5 wt % to 10 wt % of the compatibilizer.

7. The polymeric composition of claim 1, wherein the polymeric composition comprises from 2.5 wt % to 7.5 wt % maleated ethylene-based polymer.

8. The polymeric composition of claim 1, wherein the polymeric composition comprises from 2.5 wt % to 7.5 wt % ethylene n-butylacrylate glycidyl methacrylate.

9. An article comprising a polymeric tube, wherein the polymeric tube comprises the polymeric composition of claim 1.

10. The article of claim 9, wherein the article is an optical fiber cable and the polymeric tube is a buffer tube of the optical fiber cable.

* * * * *